United States Patent [19]
Breer

[11] 3,869,956
[45] Mar. 11, 1975

[54] PIN ASSEMBLY RIVET
[75] Inventor: Robert A. Breer, Nashville, Tenn.
[73] Assignee: Avco Corporation, Nashville, Tenn.
[22] Filed: Apr. 2, 1973
[21] Appl. No.: 347,178

[52] U.S. Cl................................. 85/37, 52/758 D
[51] Int. Cl.............................................. F16b 19/06
[58] Field of Search ............... 85/37, 65; 52/758 D; 151/14.5

[56] References Cited
UNITED STATES PATENTS

| | | | |
|---|---|---|---|
| 46,504 | 2/1865 | Smith | 85/37 |
| 412,243 | 10/1889 | Dion | 85/37 |
| 772,029 | 10/1904 | Clark | 85/37 |
| 2,482,391 | 10/1949 | Webster | 85/37 |
| 3,369,440 | 2/1968 | King | 85/37 |
| 3,426,641 | 2/1969 | Rosman | 85/37 |
| 3,639,137 | 2/1972 | Marinelli | 85/37 |

FOREIGN PATENTS OR APPLICATIONS

| | | | |
|---|---|---|---|
| 467,515 | 6/1937 | Great Britain | 85/37 |
| 767,547 | 2/1957 | Great Britain | 85/37 |
| 541,685 | 5/1957 | Canada | 85/37 |

Primary Examiner—Marion Parsons, Jr.
Attorney, Agent, or Firm—Charles M. Hogan; Irwin P. Garfinkle

[57] ABSTRACT

A rivet consists of a right circular cylinder pin and a collar slidably positioned at one end thereof. The other end of the cylinder has a hemispherical cavity drilled on its longitudinal axis and the cavity is filled with a hydraulic medium. When the pin is upset by conventional riveting equipment, the cavity end of the pin expands into a countersink drilled in the workpiece. The collar end expands into a relief in the collar.

1 Claim, 8 Drawing Figures

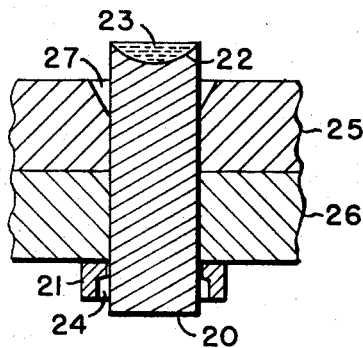
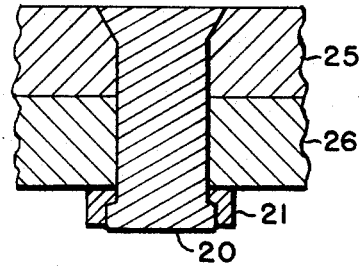
Fig 1a  Fig 1b
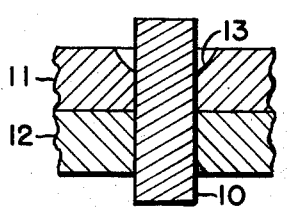
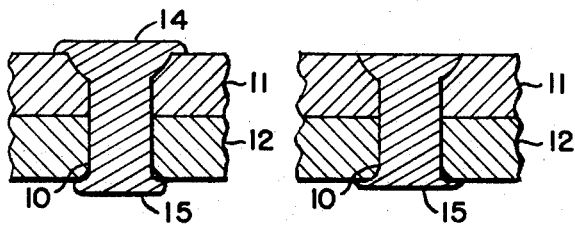
Fig 2a  Fig 2b  Fig 2c
PRIOR ART
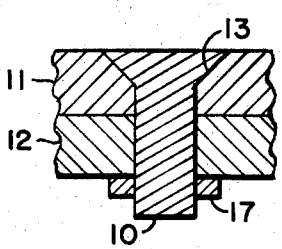
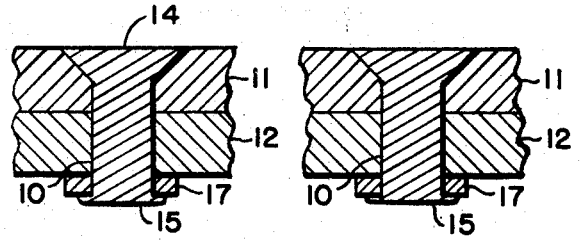
Fig 3a  Fig 3b  Fig 3c
PRIOR ART

PIN ASSEMBLY RIVET

BACKGROUND OF THE INVENTION

There are literally thousands of known prior art fastening devices including many types for fastening aluminum components of high performance aircraft structures. Special high strength fasteners have evolved. These specialty fasteners are also designed to favorably influence the fatigue life of the structures which they join by the recognized phenomenon of "hole propping." This phenomenon may be achieved by the interference fit of bolts in "undersize" holes or by the expansion of rivet type fasteners in clearance holes.

It is generally held that a suitable rivet type fastener offers the better potential for lowering the cost of fastener manufacture and installation, and also for the imparting of higher levels of fatigue life to structures. However, because the special rivets must feature high static shear strength through use of titanium or other high strength alloys that are much harder and stronger than aluminum, great care in the design and employment of such rivets is necessary. Otherwise, the upset of such rivets would introduce unacceptable deformation and distortion in the aluminum workpiece and frequently promote a stress corrosion condition in many of the aluminum alloys used in aircraft construction.

THE DRAWINGS

FIG. 1a shows a cross-sectional view of my novel rivet prior to upset;

FIG. 1b shows the rivet after upset;

FIGS. 2a, 2b and 2c show a prior art rivet in various stages; and

FIGS. 3a, 3b and 3c show still another prior art rivet.

SUMMARY OF THE INVENTION

This invention consists of a high performance rivet in which are incorporated novel means for converting a portion of the axial upsetting forces into somewhat scheduled radial forces so as to reduce or eliminate excessive compressive stresses from being induced into the workpieces being joined. The rapid, radial expansion of the forming flush head gives a larger area of bearing, on the workpiece, to resist the ever-increasing axial upsetting forces. The rivet consists of a cylindrical pin, one end of which carries an axially slidable collar. The other end has a hemispherical axial cavity filled with a fluid medium. The collar is maintained on the pin by a friction fit, or by means of a friction sealant. The outboard end of the collar is provided with a radial relief or countersink. The pin projects through the workpieces to be fastened. The surface of the workpieces adjacent the cavity end of the pin is countersunk. The fluid medium may be any fluid capable of producing a hydraulic action and adaptable to the specific pin material employed.

When the rivet is to be upset, axial forces are applied to the pin in a conventional manner. However, portions of these axial forces are transmitted radially through the hydraulic medium to provide radial expansion of the cavity end of the pin into the countersink of the workpiece, and to permit the radial expansion of the collar end of the pin into the radial relief of the collar.

THE PRIOR ART

There are several high performance rivet type fasteners used to a limited application in modern aircraft structures. Also, a number of bolt type fasteners are used more commonly. Both types are often made of titanium alloys because of their high strength-to-weight-ratio.

The known interference-fit bolt type fasteners commonly employed have not been entirely satisfactory because of high cost, and because of their non-optimum fatigue performance imparted to the structural members due to inadequate hole propping. Interference fit fasteners have a precision hole preparation requirement greater than for rivets; this is particularly costly.

The known rivet type fasteners, when installed in aluminum structures, do not expand uniformly when upset. In some cases, the shortcoming is excessive expansion causing workpiece deformation, and in other cases the expansion is insufficient to gain adequate hole propping in certain areas of the grip length. The problem in developing a satisfactory titanium rivet, for aluminum structures, results from the fact that the rivet material is much harder than the aluminum structure which it joins. Upset of such a rivet in the softer aluminum structure results in a loss of control over rivet expansion. In other words, there is non-uniform, excessive shank expansion which results in local excessive structure deformation and a general distorting of the structural assembly. Such metal deformation often induces a material stress-corrosion condition.

A conventional slug rivet is shown in FIGS. 2a–2c. The rivet consists of a cylindrical titanium alloy slug 10 clearance fit through holes drilled in aluminum workpieces 11 and 12. One of the workpieces is provided with a countersink 13. Upsetting of the slug 10 expands portions of the slug to fill the countersink 13 and to produce heads 14 and 15. The protruding portion of head 14 is subsequently removed to produce a flush surface for aerodynamically-wetted structures or clearance margin in subsequent assembly. The protruding head 14 may be left unshaven in some instances (non-aerodynamically wetted).

The slug rivet shown in FIGS. 2a–2c is more fully described in an article by Speller & Randolph published February 1972 in *Aircraft Engineering*. That article points out many of the problems resulting from the expansion of the slug into the aluminum workpiece. Although the method results in the introduction of strain in the workpieces, the article claims that the strain forces are symmetrical and that the forces of distortion are balanced. My invention is an improvement over this slug rivet since it serves to reduce such forces of distortion.

The prior art rivet shown in FIGS. 3a–3c differs from the rivet shown in FIGS. 2a–2c in that a washer 17 is freely positioned on one end. The use of the washer helps to distribute the compressive forces so as to reduce some of the attendant distortion; however, the lack of a uniformly created rivet expansion throughout the axial length results in non-uniform and insufficient interference for high performance fatigue strength imparted to the structure. In addition, such a rivet requires two piece handling, and is expensive to manufacture because of its requirement for a precisely manufactured head.

DESCRIPTION OF THE INVENTION

The rivet system disclosed in accordance with this invention is shown in FIGS. 1a and 1b. It consists of a right circular cylindrical pin 20 with a collar 21. The collar 21 is held on the "bucktail" end of the pin 20. The tip end of the pin 20 is provided with a hemispherical cavity 22 which contains a hydraulic medium 23. While the root portion of the collar is engaged on the pin, the outboard end of the collar 21 is provided with a radial relief or countersink 24. Collar position may be held during handling by an interference fit or by a friction inducing medium.

The pin 20 with its frictionally held collar 21 is inserted through holes in workpieces 25 and 26 with which there is an initial interference fit or initial clearance fit. The workpiece 25 is provided with a countersink 27 on its surface adjacent the cavity end of the pin 20.

The hydraulic medium may be any material not capable of sustaining large internal shear forces in comparison to the other metallic components. It has been found that Lubriplate 930–AA, manufactured by Fiske Brothers Refining Co., is a suitable hydraulic material for this application. Preferably Lubriplate 930–AA is encapsulated in micro-balloons so that it will be self-contained within the cavity for ease of handling. Chromate inhibited polysulfide sealant is another hydraulic medium which may be used. A material of this type is advantageous in that it also provides an environmental sealant. This material may also be encapsulated in micro-balloons. Micro-balloons are formed in accordance with U.S. Air Force Specification MIL–C–83130 and MIL–S–8802. In addition, a zinc chromate primer will also be satisfactory as the hydraulic medium.

The hydraulic medium promotes radial expansion of the pin tip and reduces the axial upsetting forces so that expansion of the pin is more closely controlled. With proper setting of the protrusion of the pin tip from the workpieces, upsetting results in an expansion of the tip into the countersink so that the rivet head is flush without shaving.

The geometry of the cavity, aside from carrying the hydraulic medium and allowing impingement of radial hydraulic forces, lends to the creation of a final shape consistent with a flush head even without the use of the hydraulic medium. In addition to promoting the radial distribution of upsetting force, the hydraulic medium serves as a lubricant, and this also promotes radial expansion by reducing anvil friction during upset.

The effects of the hydraulic medium are sustained by using a nearly flat upset anvil or ram so that the medium is locked in the cavity.

The outer diameter of the pin tip may be slightly tapered to afford easy entry into the clearance holes in the structures to be joined. The collar component root diameter is a close fit to the pin diameter.

The rivet disclosed in FIGs. 1a and 1b has at least the following advantages over prior art rivets or bolt type fasteners:

1. The rivet provides one piece handling because the collar is pre-engaged to the pin and because the fluid medium is of a material which can be self-contained within the cavity.

2. The titanium rivet when properly installed in an aluminum structure does not excessively deform the structure.

3. Flush heading is automatically achieved during upset by properly setting the amount of initial protrusion of the pin from the workpieces.

4. Because of its novel method of force redistribution and collar interlock, the rivet may be adaptable to strong impulse, impact-upset-force methods that are normally incompatible with strain rate sensitive rivet materials, such as titanium.

5. Manufacture of the rivet is lower in cost than presently available fasteners used in similar high performance applications. All the components are manufactured from mill stock on automatic machines without the requirement of intermediate heading, heat treating, or several other process steps commonly used.

6. Nominally uniform interference is imparted throughout the straight grip length, i.e., the total thickness of the workpieces 25 and 26, and interference is also imparted in the countersink hole.

7. The control of rivet expansion-and-upset afforded by (a) the novel tip and (b) collar shape enables the use of very high strength steel and nickel base alloys for the rivet material in aluminum structures.

I claim:

1. In combination with a workpiece of metallic material, said workpiece having a cylindrical hole therethrough and a countersink in one surface thereof, a fastener comprising:

a cylindrical pin of titanium alloy extending through said hole, said alloy being harder than the metallic material of said workpiece, a cavity being formed in one end of said pin on the axis thereof, a hydraulic fluid medium in said cavity, said pin being upsettable by axial forces so applied that the fluid forces the cavity end of said pin radially to expand and descend into said countersink, and a collar formed with a radial relief and frictionally engaging the end of said pin opposite to said cavity end so that said axial forces extrude a marginal portion of said opposite end of said pin into said radial relief.

* * * * *